United States Patent Office 3,433,843
Patented Mar. 18, 1969

3,433,843
SELECTIVE HYDROGENATION OF TRANS,CIS-1,5-CYCLODECADIENE TO CIS-CYCLODECENE
James Hoekstra, Evergreen Park, Ill., assignor to Universal Oil Products Company, Des Plaines, Ill., a corporation of Delaware
No Drawing. Filed Oct. 9, 1967, Ser. No. 673,973
U.S. Cl. 260—666     5 Claims
Int. Cl. C07c 5/06

ABSTRACT OF THE DISCLOSURE

A process for converting trans,cis-1,5-cyclodecadiene to cis-cyclodecene. The trans,cis-1,5-cyclodecadiene is selectively hydrogenated over a palladium catalyst. An isomer of trans,cis-1,5-cyclodecadiene, formed as a by-product, is separated from the reaction mixture and selectively hydrogenated to cis-cyclodecene to give an improved product yield.

BACKGROUND OF THE INVENTION

This invention relates to a process for converting trans, cis-1,5-cyclodecadiene to cis-cyclodecene, a useful intermediate in the production of sebacic acid. The trans,cis-1,5-cyclodecadiene, selectively hydrogenated to cis-cyclodecene in accordance with the method of this invention, is known in the art, being prepared, for example, by the cyclocooligomerization of two moles of butadiene with one mole of ethylene in the presence of a catalyst described as a π-allyl nickel complex. A description of the trans,cis-1,5-cyclodecadiene as well as its preparation is found in Angewandte Chemie, International Edition, vol. II, No. 3, p. 105, March 1963, and vol. III, No. 10, p. 702, October 1964.

The 1,5-cyclodecadiene can be converted to cyclodecene by conventional hydrogenation techniques although selectivity is markedly less than desired and inadequate for industrial use. It is highly desirable to effect subtantially complete conversion of the cyclodecadiene starting material as it is extremely difficult to separate unreacted material from the reaction mixture by conventional methods for recycle in a continuous process or recovery in a batch process. At reaction conditions effecting substantially complete conversion of said cyclodecadiene coupled with optimum selectivity, other reaction products are formed comprising the saturated cyclodecane and principally a cyclodecadiene isomer tentatively identified as cis,cis-1,6-cyclodecadiene. It has been observed that the cyclodecadiene isomer is extremely difficult to hydrogenate with any degree of selectivity at conditions to effect substantially complete conversion thereof to the desired cyclodecene product, the isomer being preferentially converted, if at all, to the saturated cyclodecane. Thus, the formation of cyclodecadiene isomer in the course of the selective hydrogenation process has heretofore precluded substantially complete conversion of the trans,cis-1,5-cyclodecadiene starting material to the desired cyclodecene product.

The ratio of the cyclodecadiene isomer to the saturated cyclodecane formed as by-products of the reaction is primarily a function of the catalyst employed. Palladium, although desirable from the standpoint that it effects a minimum conversion to the saturated cyclocane, has heretofore been considered unsuitable as a catalyst since it effects excessive isomerization of the 1,5-cyclodecadiene to the isomeric 1,6-cyclodecadiene. By the process of this invention, the effect of isomeric cyclodecadiene formation is minimized and the utilization of a palladium catalyst is permitted with the attendant benefit of minimal cyclodecane formation and improved cyclodecene yields.

SUMMARY OF THE INVENTION

In one of its broad aspects the present invention embodies a process for converting 1,5-cyclodecadiene to cyclodecene which comprises (a) passing said 1,5-cyclodecadiene to a first reaction zone in admixture with hydrogen and in contact with a palladium catalyst at a temperature of from about —50° to about 80° C. and at a hydrogen pressure of from about 200 to about 1500 p.s.i. and effecting substantially complete conversion of said 1,5-cyclodecadiene and less than about 90% conversion thereof to cyclodecene, (b) passing the reaction product to a separation zone and separating and recovering cyclodecene therefrom, (c) passing the residual reaction product comprising 1,6-cyclodecadiene to a second reaction zone in admixture with hydrogen and in contact with a palladium catalyst at a temperature of from about —50° to about 150° C. and at a hydrogen pressure of from about 200 to about 1500 p.s.i. and effecting less than 100% conversion of said, 1,6-cyclodecadiene contained therein, (d) passing the reaction product from the second reaction zone to the aforesaid separation zone in admixture with the reaction product from the first reaction zone and thus separating and recovering cyclodecene therefrom in conjunction with the cyclodecene separated and recovered from the first reaction product.

Pursuant to the present process, the cyclodecadiene starting material is passed to a first reaction zone in admixture with hydrogen and in contact with a palladium catalyst at a temperature of from about —50° to about 80° C. and at a hydrogen pressure of from about 200 to about 1500 p.s.i. Selective hydrogenation of the t,c-1,5-cyclodecadiene is suitably effected in the first reaction zone within a period of from about 1 to about 48 hours at a temperature of from about —50° C. to about 80° C., the rate of hydrogenation increasing with temperature. Selectivity drops off somewhat with increasing temperature but is substantially uneffective within the preferred temperature range of from about —10° C. to about 30° C. While it would appear that a hydrogen concentration in excess of stoichiometric amounts would be detrimental in the selective hydrogenation of one of two double bonds as herein contemplated, an excess is in fact essential. The hydrogen concentration, expressed in terms of hydrogen pressure, may be from about 200 to about 1500 p.s.i., and is preferably from about 500 to about 1000 p.s.i.

The palladium catalyst employed in the first reaction zone, as well as in the second reaction zone, will usually comprise a carrier material which may or may not contribute to the overall activity of the catalyst. Suitable carrier materials include synthetically prepared refractory inorganic oxides such as alumina, silica, zirconia, thoria, boria, etc., and also charcoals produced by the destructive distillation of wood, peat, lignite, nut shells, bones, and other carbonaceous matter, particularly such charcoals as have been heat treated and/or chemically treated to form a highly porous structure and generally described as activated carbon. Suitable carrier materials also include the naturally occurring clays and silicates, for example, diatomaceous earth, kieselguhr, etc., and also fuller's earth, attapulgus clay, feldspar, montmorillonite, halloysite, kaolin and the like.

The selective hydrogenation herein contemplated is preferably effected in contact with a catalytic composite comprising palladium and alumina. The alumina is preferably synthetic alumina although naturally occurring alumina such as is recovered from bauxite may also be utilized. The description "alumina" is intended to include porous alumina in its various states of hydration and generally referred to as activated alumina. Synthetically prepared alumina may be of the gel type generally prepared by precipitation methods. For example, an alkaline reagent such as ammonium hydroxide is commingled with an aqueous solution of aluminum chloride, or other suitable acidic solution of aluminum salt, to precipitate the desired alumina. An alternative method comprises commingling hydrochloric acid, sulfuric acid, or the like, with an alkaline solution of an aluminum salt, for example, sodium aluminate, and precipitating alumina.

The alumina is suitably utilized in the form of spheres, extrudates, granules, briquettes, or the like. A preferred form is the low density sphere prepared, for example, by the well-known oil-drop method wherein a sol, prepared by digesting alumina in hydrochloric acid at a controlled pH, is discharged by means of a nozzle or rotating disc into a hot oil bath, forming gel particles during passage therethrough. This method is fully described in United States Patent 2,620,314 issued to the present inventor. In any case, the alumina is activated by one or more treatments including drying, calcining, steaming, or treatment with various chemical reagents to develop a highly porous material.

The catalyst composite of this invention may comprise from about 0.1 to about 5.0 weight percent palladium. Although a higher concentration of palladium is operable, no particular benefit is derived therefrom, particularly in view of the cost of the catalyst involved. A palladium content of from about 0.3 to about 3.0 weight percent is preferred. The quantity of palladium is based on the weight of the final catalyst composite and calculated on the basis of elemental metal notwithstanding that the palladium may exist in some complex combination with the alumina or in the elemental state.

The palladium is composited with the alumina by any suitable method. For example, the alumina can be soaked, dipped, or otherwise immersed in a solution of a suitable palladium compound including palladium chloride, chloropalladic acid, and the like. It is understood that the description "palladium" connotes palladium existing in its elemental state and/or in a combined form with the alumina, often reported as palladium oxide. The catalyst is dried and calcined prior to use. Calcination is suitably effected at a temperature of at least about 425° C., generally at a temperature in the range of from about 425° C. to about 815° C., and preferably in a reducing atmosphere such as hydrogen.

The residual reaction product recovered from the separation zone will comprise the aforesaid cyclodecadiene isomer, i.e., 1,6-cyclodecadiene. As previously mentioned, the cyclodecadiene isomer is extremely difficult to hydrogenate with any degree of selectivity at conditions to effect substantially complete conversion thereof to the desired cyclodecene. Thus, in accordance with the present process, the cyclodecadiene isomer is passed to a second reaction zone in admixture with hydrogen and treated therein at conditions to convert less than 100% of said cyclodecadiene. Suitable reaction conditions include a temperature of from about −50° C. to about 150° C. and a hydrogen pressure of from about 200 to about 1500 p.s.i. Preferably, the temperature is maintained at from about 20° to about 60° C. and the hydrogen pressure at from about 500 to about 1000 p.s.i. The degree of conversion is determined by a contact time commensurate with selected temperature and pressure, a suitable contact time usually being within the range of from about 0.5 to about 5 hours.

Substantially complete conversion of a cyclodecadiene isomer is accomplished by commingling the second reaction zone effluent with the first reaction zone effluent. The combined products are then treated in the separation zone as aforesaid, the unconverted cyclodecadiene isomer from the second reaction zone being recovered therefrom together with the cyclodecadiene isomer from the first reaction zone and recycled to said second reaction zone for further treatment therein.

In a typical operation whereby 1,5-cyclodecadiene is selectively hydrogenated to cyclodecene with 97–98% selectivity at substantially 100% conversion, 1,5-cyclodecadiene is passed in contact with a palladium catalyst comprising .75 weight percent palladium on an alumina support. The 1,5-cyclodecadiene is passed in contact with the catalyst at a liquid hourly space velocity of about 2.9, a temperature of approximately 5° C. and in admixture with hydrogen, the hydrogen pressure and flow rate being established at 750 p.s.i., and 2.5 standard cubic feet per hour. Excess hydrogen is separated from the resulting reaction mixture which further comprises about 86% cyclodecene, 13% 1,6-cyclodecadiene and 1% cyclodecane, the excess hydrogen being recycled for further use. The last mentioned mixture of reaction products is then passed in contact with 10× molecular sieves at a temperature of about 45° C. whereby cyclodecene is separated and the 1,6-cyclodecadiene recovered for further processing. The 1,6-cyclodecadiene thus recovered is selectively hydrogenated to cyclodecene at about 85% conversion, said cyclodecadiene being passed in contact with a palladium catalyst substantially as described. Said cyclodecadiene is passed in contact with the catalyst at a liquid hourly space velocity of about 2, a temperature of 40° C. and in admixture with hydrogen at a pressure and flow rate substantially as described above. Excess hydrogen is separated from the resulting reaction mixture either before or after combining the same with the first mentioned mixture of reaction products. The reaction mixtures are then commonly treated in contact with the aforesaid molecular sieve adsorbents whereby cyclodecene is separated as product and 1,6-cyclodecadiene recovered for further processing as herein described.

I claim as my invention:

1. A process for converting 1,5-cyclodecadiene to cyclodecene which comprises:

(a) passing said 1,5-cyclodecadiene to a first reaction zone in admixture with hydrogen and in contact with a palladium catalyst at a temperature of from about −50° to about 80° C. and at a hydrogen pressure of from about 200 to about 1500 p.s.i. and effecting substantially complete conversion of said 1,5-cyclodecadiene and less than about 90% conversion thereof to cyclodecene, (b) passing the reaction product to a separation zone and separating and recovering cyclodecene therefrom, (c) passing the residual reaction product comprising 1,6-cyclodecadiene to a second reaction zone in admixture with hydrogen and in contact with a palladium catalyst at a temperature of from about −50° to about 150° C. and at a hydrogen pressure of from about 200 to about 1500 p.s.i. and effecting less than 100% conversion of said 1,6-cyclodecadiene contained therein, (d) passing the reaction product from the second reaction zone to the aforesaid separation zone in admixture with the reaction product from the first reaction zone and separating and recovering cyclodecene therefrom in conjunction with the cyclodecene separated and recovered from the first reaction zone reaction product.

2. The process of claim 1 further characterized with respect to step (a) in that said temperature is from about −10° to about 30° C.

3. The process of claim 2 further characterized with respect to step (b) in that said temperature is from about 20° to about 60° C.

4. The process of claim 3 further characterized with respect to step (a) and step (b) in that said hydrogen pressure is from about 500 to about 1000 p.s.i.

5. The process of claim 4 further characterized with respect to step (a) and step (b) in that said catalyst comprises from about 0.1 to about 5.0 weight percent palladium composited with alumina.

References Cited

UNITED STATES PATENTS

| | | |
|---|---|---|
| 3,285,983 | 11/1966 | Arrigo. |
| 3,294,853 | 12/1966 | Arrigo. |
| 3,296,320 | 1/1967 | Arrigo. |
| 3,360,577 | 12/1967 | Pickles. |

PAUL M. COUGHLAN, JR., *Primary Examiner.*

V. O'KEEFE, *Assistant Examiner.*